US011783980B2

(12) United States Patent
Pantier et al.

(10) Patent No.: US 11,783,980 B2
(45) Date of Patent: Oct. 10, 2023

(54) SOLENOID WITH NO METAL-TO-METAL WEAR COUPLES IN DEFAULT POSITION

(71) Applicant: HONEYWELL INTERNATIONAL INC., Charlotte, NC (US)

(72) Inventors: David J. Pantier, Tempe, AZ (US); Kevin A. K. Jones, Chandler, AZ (US); Joseph C. Wagner, Scottsdale, AZ (US); Mitchell McGinty, Phoenix, AZ (US); Zachary Sherwin, Gilbert, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 90 days.

(21) Appl. No.: 17/648,008

(22) Filed: Jan. 14, 2022

(65) Prior Publication Data

US 2022/0230796 A1 Jul. 21, 2022

Related U.S. Application Data

(60) Provisional application No. 63/138,921, filed on Jan. 19, 2021.

(51) Int. Cl.
*H01F 7/08* (2006.01)
*H01F 7/16* (2006.01)
*F16K 31/06* (2006.01)

(52) U.S. Cl.
CPC ....... *H01F 7/1638* (2013.01); *F16K 31/0675* (2013.01)

(58) Field of Classification Search
CPC .... H01F 7/1638; H01F 7/121; F16K 31/0675; F16K 31/0679
USPC .......................................................... 335/222
See application file for complete search history.

(56) References Cited

U.S. PATENT DOCUMENTS

| 8,436,704 | B1* | 5/2013 | Venkataraghavan | ... H01F 7/081 335/220 |
| 2003/0080305 | A1* | 5/2003 | Schafer | ................. H01F 7/1607 251/129.07 |
| 2004/0100345 | A1* | 5/2004 | Kobayashi | ............ H01F 7/1607 335/220 |
| 2012/0268225 | A1* | 10/2012 | Mahajan | ............... H01F 7/1607 335/261 |
| 2016/0064132 | A1* | 3/2016 | Mahajan | .................. H01F 5/02 335/255 |
| 2019/0131048 | A1* | 5/2019 | Bavisetti | ............... H01F 7/1607 |
| 2019/0323623 | A1* | 10/2019 | Mahajan | ............... H01F 7/1607 |
| 2020/0051723 | A1* | 2/2020 | Mahajan | ................. H01F 7/121 |

\* cited by examiner

*Primary Examiner* — Shawki S Ismail
*Assistant Examiner* — Lisa N Homza
(74) *Attorney, Agent, or Firm* — Lorenz & Kopf LLP

(57) ABSTRACT

A solenoid actuator includes a housing assembly, a bobbin assembly, a coil, an armature, an actuation rod, a guide ring, a lower spring guide, an upper spring guide, and a spring. The actuation rod is fixedly coupled to the armature, and the guide ring, the lower spring guide, the upper spring guide, and the anti-rotation structure all comprise a non-metallic material.

20 Claims, 2 Drawing Sheets

SOLENOID WITH NO METAL-TO-METAL WEAR COUPLES IN DEFAULT POSITION

CROSS-REFERENCE TO RELATED APPLICATION

This application claims the benefit of U.S. Provisional Application No. 63/138,921, filed on Jan. 19, 2021, the entirety of which is incorporated herein by reference.

TECHNICAL FIELD

The present invention generally relates to solenoids, and more particularly relates to a solenoid actuator that includes no metal-to-metal wear couples in the default position of the solenoid.

BACKGROUND

Solenoid actuators are electromechanical devices that convert electrical energy into linear mechanical movement. Solenoid actuators are used in myriad environments and for many applications, and typically include at least a coil, a magnetically permeable shell or case, and a movable armature. When the coil is energized, a magnetic field is generated that exerts a force on the movable armature, moving it to a desired position.

One example end-use environment is the engine start system for an aircraft. A typical aircraft engine start system utilizes pressurized air, sourced via a ground cart, APU or adjacent engine, that is fed through a Start Air Valve (SAV) into an Air Turbine Starter (ATS) that is coupled to the aircraft main engine. A solenoid actuator is typically energized to control the position of the SAV, and is generally used only for initial engine starting or under failure conditions (in-flight engine shut down). As such, the system spends a majority of the aircraft duty cycle in a non-operative state.

For solenoid actuators in SAV applications, the default or de-energized condition is of particular interest due to its minimal operating time over aircraft life. A standard SAV solenoid actuator includes a combination of both metal-to-metal and non-metallic-on-metal wear couples to ensure acceptable internal wear in the default condition to facilitate reliable performance when energized for the required SAV service life. Recent commercial applications have pushed the limits of solenoid vibration capability. Designs that have offered robust performance in on legacy engines more often need improvement to meet life requirements in new engine applications. Design improvements include reducing metal to metal contact within the solenoid and upgrading to non-metallic components that exhibit more desirable wear properties.

Hence, there is a need for a solenoid actuator that includes no metal-to-metal contact at least when it is in the default position. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a solenoid actuator includes a housing assembly, a bobbin assembly, a coil, an armature, an actuation rod, a guide ring, a lower spring guide, an upper spring guide, and a spring. The bobbin assembly is disposed at least partially within the housing assembly and includes a return pole and a yoke. The yoke has an inner surface that defines an armature cavity. The coil is disposed within the housing assembly and is wound around at least a portion of the bobbin assembly. The armature is disposed within the armature cavity and is axially movable relative to the yoke. The armature has an outer surface with a guide ring groove formed therein. The actuation rod is fixedly coupled to, and is axially moveable with, the armature. The guide ring is disposed within the guide ring groove and engages the inner surface of the yoke. The guide ring comprises a first non-metallic material. The lower spring guide is fixedly disposed within the return pole and has a lower spring guide opening through which the actuation rod extends. The lower spring guide comprises a second non-metallic material. The upper spring guide is spaced-apart from the lower spring guide and is disposed within the return pole. The upper spring guide is moveable with the actuation rod and comprises a third non-metallic material. The spring is disposed within the return pole and surrounds a portion of the actuation rod. The spring engages the upper spring guide and the lower spring guide.

In another embodiment, a solenoid actuator includes a housing assembly, a bobbin assembly, an interrupter, a coil, an armature, an actuation rod, a guide ring, a lower spring guide, an upper spring guide, a spring, and an anti-rotation structure. The bobbin is disposed at least partially within the housing assembly. The bobbin includes a return pole and a yoke that has an inner surface that defines an armature cavity. The interrupter is disposed between the return pole and the yoke. The coil is disposed within the housing assembly and is wound around at least a portion of the bobbin assembly. The armature is disposed within the armature cavity and is axially movable relative to the yoke. The armature has an outer surface with a guide ring groove formed therein. The actuation rod is fixedly coupled to, and is axially moveable with, the armature. The guide ring is disposed within the guide ring groove and engages the inner surface of the yoke. The guide ring comprises a first non-metallic material. The lower spring guide is fixedly disposed within the return pole and has a lower spring guide opening through which the actuation rod extends. The lower spring guide comprises a second non-metallic material. The upper spring guide is spaced-apart from the lower spring guide and is disposed within the return pole. The upper spring guide is moveable with the actuation rod and comprises a third non-metallic material. The spring is disposed within the return pole and surrounds a portion of the actuation rod. The spring engages the upper spring guide and the lower spring guide. The anti-rotation structure is disposed within the housing assembly and engages at least a portion of the armature. The anti-rotation structure comprises a fourth non-metallic material. The armature and the anti-rotation structure each have at least one feature formed thereon that mate with each other and thereby prevent rotation of the armature. The first, second, third, and fourth non-metallic materials each comprise materials selected from the group consisting of a thermoplastic polymer, a polytetrafluoroethylene (PTFE), and a fluorinated ethylene propylene (FEP) material.

Furthermore, other desirable features and characteristics of the solenoid actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
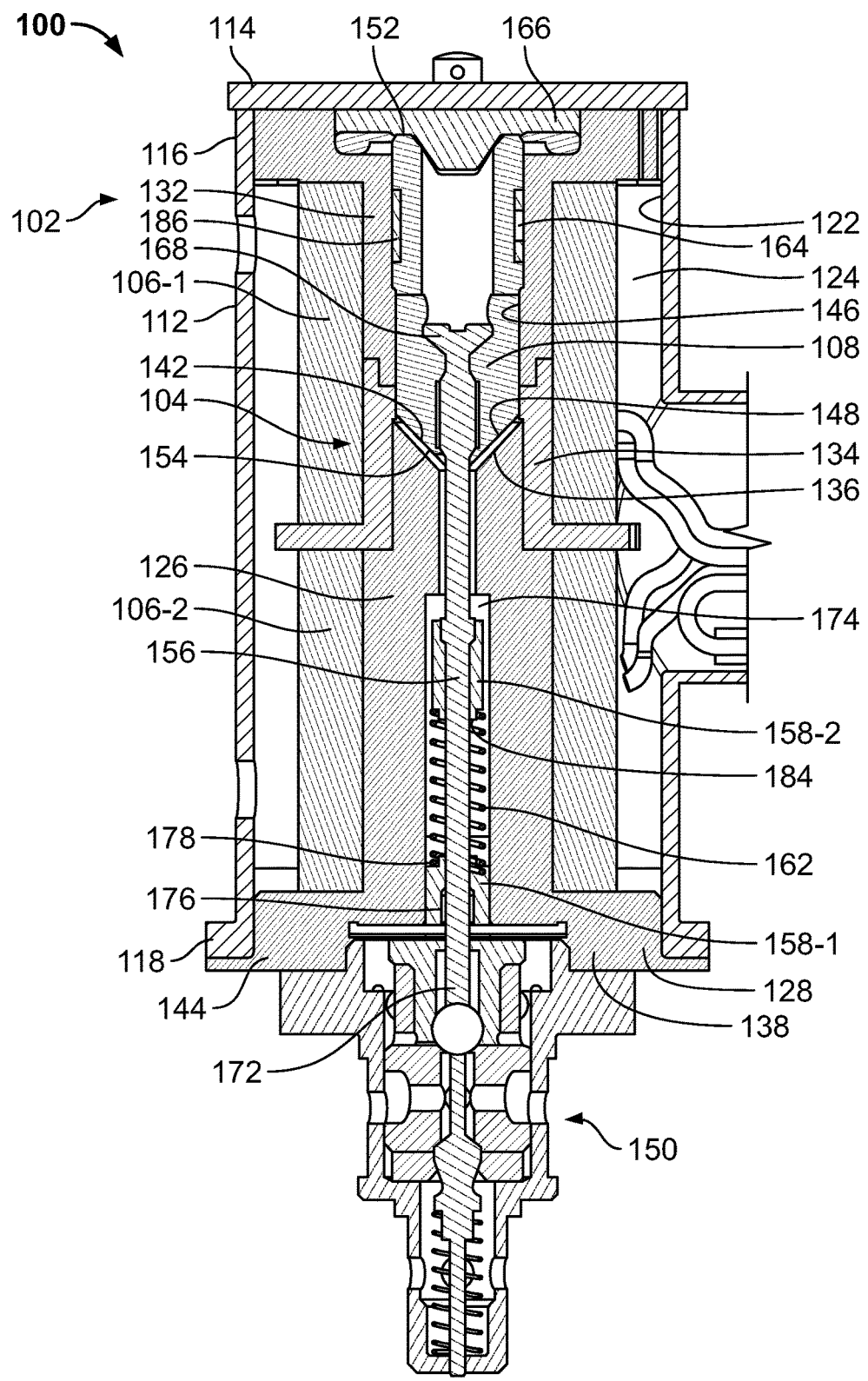
FIG. 1 depicts a cross section view of one example embodiment of a solenoid actuator.
Figure 2:
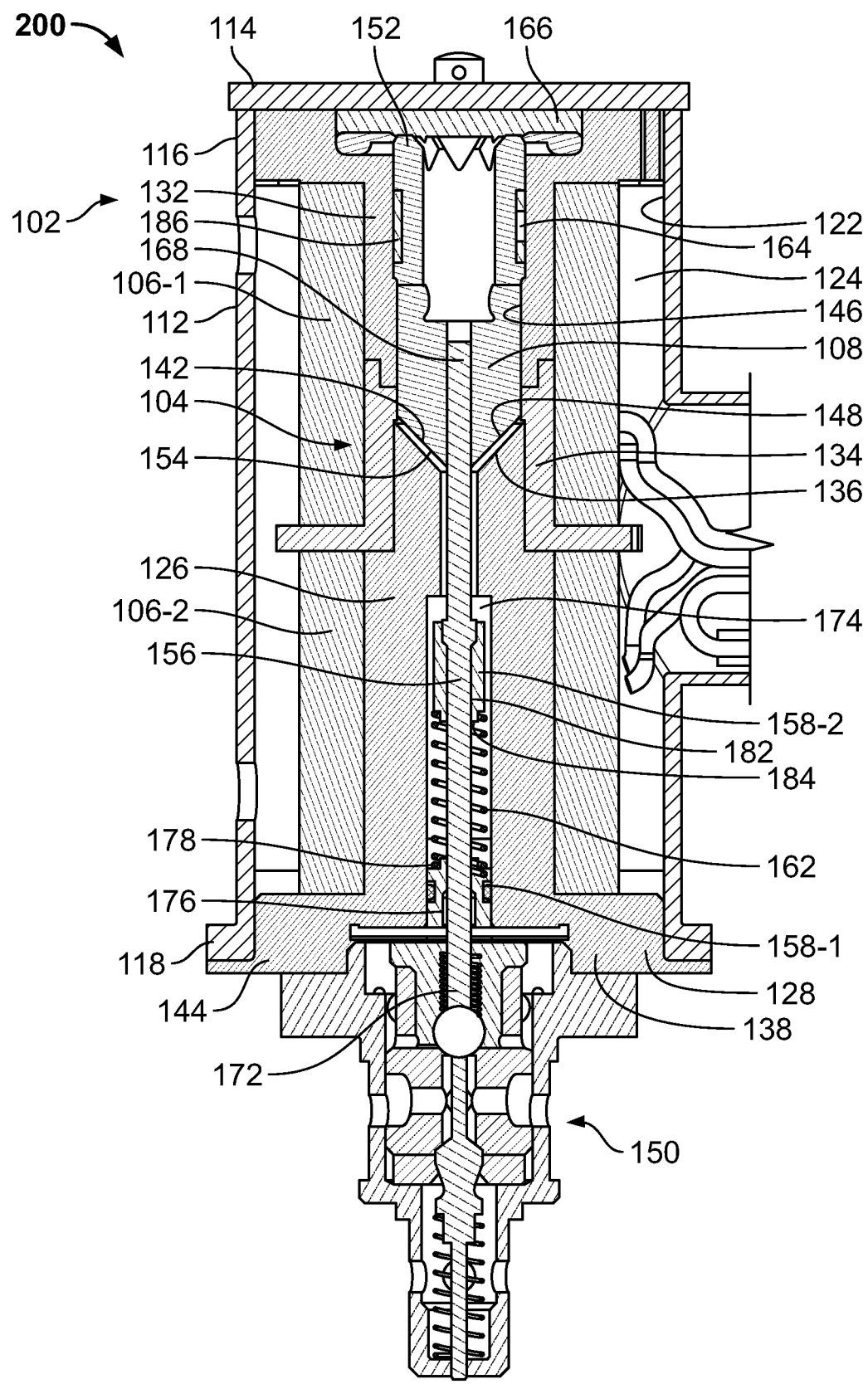
FIG. 2 depicts a cross section view of another example embodiment of a solenoid actuator.

Referring to FIGS. 1 and 2, cross section views of two exemplary embodiments of a solenoid actuator 100, 200 are depicted. The solenoid actuators 100, 200 each include at least a housing assembly 102, a bobbin assembly 104, a plurality of coils 106 (106-1, 106-2), and an armature 108. The housing assembly 102 includes a housing 112 and a cover plate 114. The housing 112 is configured to include a housing first end 116, a housing second end 118, and an inner surface 122 that defines a housing cavity 124. The housing 112 may comprise any one of numerous materials having a relatively high magnetic permeability such as, for example, magnetic steel. The housing 112, in addition to having a plurality of components disposed therein, provides a flux path, together with the bobbin assembly 104, for magnetic flux that the coil 106 generates when it is electrically energized. The cover plate 114 is coupled to the housing first end 116, and may also comprise any one of numerous materials having a relatively high magnetic permeability.

The bobbin assembly 104 includes at least a bobbin 126, a return pole 128, a yoke (or stop) 132, and an interrupter 134. The return pole 128 is fixedly coupled to the housing second end 118 and extends into the housing cavity 124. The return pole 128 preferably comprises a material having a relatively high magnetic permeability. The return pole 128, together with the housing 112, the armature 108, and the yoke 132 provides a magnetic flux path for the magnetic flux that is generated when the coils 106 are energized. The return pole 128 includes a return pole first end 136 and a return pole second end 138. The return pole first end 136 extends into the housing cavity 124. The return pole first end 136 is surrounded by, or at least partially surrounded by, the coils 106, and defines an armature seating surface 142. The return pole second end 138 defines a flange portion 144 that is disposed within the housing cavity 124, and on which the bobbin 126 is disposed.

The interrupter 134 is disposed between the return pole 128 and the yoke 132 and is also disposed between the two coils 106-1, 106-2. The interrupter 134 diverts the magnetic flux in the working air gap when the coils 106 are energized. The interrupter 134 may be manufactured from various non-magnetic materials, such as brass or non-magnetic steel (e.g. CRES 302).

The coils 106 are disposed within the housing 112 and are adapted to be electrically energized from a non-illustrated electrical power source. As noted above, when energized, the coils 106 generate magnetic flux. In the depicted embodiment, the coils 106 are wound around a portion of the bobbin 126, and each comprises a relatively fine gauge (e.g., 30-38 AWG) magnet wire, though larger gauge magnet wire could also be used. The magnet wire may be fabricated from any one of numerous conductive materials including, but not limited to, copper, aluminum, nickel, and silver. Although two coils 106 are depicted in FIG. 1, it will be appreciated that the solenoid actuator 100 could be configured with more or less than this number of coils, if needed or desired.

The armature 108 is disposed (at least partially) within the yoke 132. More specifically, the yoke 132 has an inner surface 146 that defines an armature cavity. The armature 108 is disposed (at least partially) within the armature cavity and is axially movable relative to the yoke 132. The depicted armature 108 includes an armature first end 148 and an armature second end 152, and preferably comprises a material having a relatively high magnetic permeability. The armature first end 148 is at least partially surrounded by the coil 106 and defines a return pole engagement surface 154. As noted previously, the armature 108, together with the solenoid housing 112, the return pole 128, and the yoke 132, provides a magnetic flux path for the magnetic flux that is generated by the coil 106 when it is energized. This results in axial movement of the armature 108 within the housing 112 between a first position and a second position. The armature 108 preferably comprises a metallic material, such as, for example, a magnetic iron.

The depicted solenoid actuator 100 additionally includes an actuation rod 156, a pair of spring guides 158—a lower spring guide 158-1 and an upper spring guide 158-2—spring 162, a guide ring 164, and an anti-rotation structure 166. The actuation rod 156 includes a first end 168 and a second end 172. The actuation rod 156 is fixedly coupled, via its first end 168, to the armature 108, and extends through a return pole bore 174 that extends between the return pole first end 136 and the return pole second 138. The actuation rod 156 also extends from the housing 102 to its second end 172. The second end 172 is coupled to a component 150, such as, for example, a valve, that is to be actuated by the solenoid actuator 100. It will be appreciated that the actuation rod 156 may be fixedly coupled to the armature 108 using any one of numerous techniques. In the embodiment depicted in FIG. 1, it is fixedly coupled via mating threads that are formed on the armature 108 and the actuation rod 156. In the embodiment depicted in FIG. 2, the actuation rod 156 is fixedly coupled to the armature 108 via braze joint. It should be noted that in both embodiments, this fixed coupling prevents any potential metal-to-metal sliding contact.

The spring guides 158 are disposed within the return pole bore 174 and surround different portions of the actuation rod 156. More specifically, the lower spring guide 158-1 is fixedly disposed in the return pole bore 174 adjacent to the return pole second end 138 and includes a lower spring guide opening 176 and a lower spring guide land 178. The actuation rod 156 extends through the lower spring guide opening 176, which is dimensioned such that the actuation rod 156 is moveable relative to the lower spring guide 158-1. The upper spring guide 158-2 is fixedly coupled to the actuation rod 156 and is moveable therewith within the return pole bore 174. The upper spring guide 158-2 includes an upper spring guide opening 182 and an upper spring guide land 184. The actuation rod 156 extends through the upper spring guide opening 182, which is dimensioned such that the upper spring guide 158-2 is slip fit onto the actuation rod 156 and is retained against a larger diameter portion of the actuation rod 156. The spring guides 158 are both formed of a non-metallic material, thereby eliminating metal-to-metal sliding contact between these spring guides 158 and the return pole 128, and to improve wear resistance between the actuating rod 156 and spring guides 158 as well as the spring guides 158 and the return spring 162. Some non-limiting examples of suitable non-metallic materials include, but are not limited to, a thermoplastic polymer, a polytetrafluoroethylene (PTFE), and a fluorinated ethylene propylene (FEP) material, just to name a few.

The spring 162 is disposed within the housing 102 and is configured to supply a bias force to the armature 108 that urges the armature 108 toward the first position. More specifically, the spring 162 is disposed within the return pole bore 174 and engages the lower spring guide 158-1 and the upper spring guide 158-2 via the lower and upper spring guide lands 178, 184. Thus, the spring 162 supplies the bias force to the armature 108 via the upper spring guide 158-2 and the actuation rod 156. The spring 162 may be formed of various metallic materials. In the depicted embodiment it is formed of 17-7 pH stainless steel. In other embodiments, however, it could be formed of other metallic materials, such as 300 Series CRES, just to name a few.

The guide ring 164 is coupled to and surrounds a portion of the armature 108. The guide ring 164 is thus disposed within the armature cavity and is axially moveable, with the armature 108, relative to the yoke 132. The guide ring 164 is disposed within a guide ring groove 186 that is formed in an outer surface of the armature 108. The guide ring 164 engages the inner surface 146 of the yoke 132 and is formed of a non-metallic material, thereby eliminating metal-to-metal sliding contact between the armature 108 and the yoke 132. Some non-limiting examples of suitable non-metallic materials include, but are not limited to, a thermoplastic polymer, a polytetrafluoroethylene (PTFE), and a fluorinated ethylene propylene (FEP) material, just to name a few.

The anti-rotation structure 166 is disposed within the housing 102 and engages at least a portion of the armature 108. The anti-rotation structure 166 and the armature 108 each have at least one feature formed thereon that mate with each other and thereby prevent any armature rotation that may occur when the coil 106 is de-energized, and/or if the solenoid actuator 100 is exposed to vibration. It will be appreciated that the anti-rotation structure 166 and the armature 108 may be variously configured to implement this function. Two different example configurations are depicted in FIGS. 1 and 2. Regardless of the particular configuration, the anti-rotation structure 166 is formed of a non-metallic material, thereby eliminating metal-to-metal sliding contact between the anti-rotation structure and the armature 108. Some non-limiting examples of suitable non-metallic materials include, but are not limited to, a thermoplastic polymer, a polytetrafluoroethylene (PTFE), and a fluorinated ethylene propylene (FEP) material, just to name a few.

The solenoid actuator 100 disclosed herein includes various components that comprise a non-metallic material, such as a thermoplastic polymer, a polytetrafluoroethylene (PTFE), or a fluorinated ethylene propylene (FEP), and thus eliminate on metal-to-metal sliding contact.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A solenoid actuator, comprising:
   a housing assembly;
   a bobbin assembly disposed at least partially within the housing assembly, the bobbin assembly including a return pole and a yoke, the yoke having an inner surface that defines an armature cavity;
   a coil disposed within the housing assembly and wound around at least a portion of the bobbin assembly;
   an armature disposed within the armature cavity and axially movable relative to the yoke, the armature having an outer surface with a guide ring groove formed therein;
   an actuation rod fixedly coupled to, and axially moveable with, the armature;
   a guide ring disposed within the guide ring groove and engaging the inner surface of the yoke, the guide ring comprising a first non-metallic material;
   a lower spring guide fixedly disposed within the return pole and having a lower spring guide opening through which the actuation rod extends, the lower spring guide comprising a second non-metallic material;
   an upper spring guide spaced-apart from the lower spring guide and disposed within the return pole, the upper spring guide moveable with the actuation rod and comprising a third non-metallic material; and
   a spring disposed within the return pole and surrounding a portion of the actuation rod, the spring engaging the upper spring guide and the lower spring guide.

2. The solenoid actuator of claim 1, wherein the first, second, and third non-metallic materials are identical.

3. The solenoid actuator of claim 1, wherein the first, second, and third non-metallic materials each comprise materials selected from the group consisting of a thermoplastic polymer, a polytetrafluoroethylene (PTFE), and a fluorinated ethylene propylene (FEP) material.

4. The solenoid actuator of claim 1, further comprising:
an anti-rotation structure disposed within the housing assembly and engaging at least a portion of the armature, the anti-rotation structure comprising a fourth non-metallic material,
wherein the armature and the anti-rotation structure each have at least one feature formed thereon that mate with each other and thereby prevent rotation of the armature.

5. The solenoid actuator of claim 4, wherein the first, second, third, and fourth non-metallic materials are identical.

6. The solenoid actuator of claim 4, wherein the first, second, third, and fourth non-metallic materials each comprise materials selected from the group consisting of a thermoplastic polymer, a polytetrafluoroethylene (PTFE), and a fluorinated ethylene propylene (FEP) material.

7. The solenoid actuator of claim 1, wherein the housing assembly comprises:
a housing having a housing first end, a housing second end, and an inner surface that defines a cavity; and
a cover plate coupled to the housing first end.

8. The solenoid actuator of claim 1, further comprising:
an interrupter disposed between the return pole and the yoke.

9. The solenoid actuator of claim 1, wherein:
the coil comprises a first coil and a second coil; and
the interrupter is disposed between the first coil and the second coil.

10. The solenoid actuator of claim 1, wherein:
the yoke includes an inner surface that defines an armature cavity; and
the armature is disposed at least partially within the armature cavity and is movable relative to the yoke.

11. The solenoid actuator of claim 1, wherein:
the armature includes an armature first end and an armature second end;
the armature first end is at least partially surrounded by the coil and defines a return pole engagement surface.

12. The solenoid actuator of claim 1, wherein:
the actuation rod includes a first end and a second end;
the first end is coupled to the armature; and
the second end is coupled to a component that is to be actuated.

13. The solenoid actuator of claim 1, wherein:
the lower spring guide includes a lower spring guide opening and a lower spring guide land;
the upper spring guide includes an upper spring guide opening and an upper spring guide land;
the actuation rod extends through the lower spring guide opening and the upper spring guide opening; and
the spring engages the upper spring guide land and the lower spring guide land.

14. A solenoid actuator, comprising:
a housing assembly;
a bobbin assembly disposed at least partially within the housing assembly, the bobbin assembly including a return pole and a yoke, the yoke having an inner surface that defines an armature cavity;
an interrupter disposed between the return pole and the yoke;
a coil disposed within the housing assembly and wound around at least a portion of the bobbin assembly;
an armature disposed within the armature cavity and axially movable relative to the yoke, the armature having an outer surface with a guide ring groove formed therein;
an actuation rod fixedly coupled to, and axially moveable with, the armature;
a guide ring disposed within the guide ring groove and engaging the inner surface of the yoke, the guide ring comprising a first non-metallic material;
a lower spring guide fixedly disposed within the return pole and having a lower spring guide opening through which the actuation rod extends, the lower spring guide comprising a second non-metallic material;
an upper spring guide spaced-apart from the lower spring guide and disposed within the return pole, the upper spring guide moveable with the actuation rod and comprising a third non-metallic material;
a spring disposed within the return pole and surrounding a portion of the actuation rod, the spring engaging the upper spring guide and the lower spring guide; and
an anti-rotation structure disposed within the housing assembly and engaging at least a portion of the armature, the anti-rotation structure comprising a fourth non-metallic material,
wherein:
the armature and the anti-rotation structure each have at least one feature formed thereon that mate with each other and thereby prevent rotation of the armature, and
the first, second, third, and fourth non-metallic materials each comprise materials selected from the group consisting of a thermoplastic polymer, a polytetrafluoroethylene (PTFE), and a fluorinated ethylene propylene (FEP) material.

15. The solenoid actuator of claim 14, wherein the first, second, third, and fourth non-metallic materials are identical.

16. The solenoid actuator of claim 14, wherein the housing assembly comprises:
a housing having a housing first end, a housing second end, and an inner surface that defines a cavity; and
a cover plate coupled to the housing first end.

17. The solenoid actuator of claim 14, wherein:
the yoke includes an inner surface that defines an armature cavity; and
the armature is disposed at least partially within the armature cavity and is movable relative to the yoke.

18. The solenoid actuator of claim 14, wherein:
the armature includes an armature first end and an armature second end;
the armature first end is at least partially surrounded by the coil and defines a return pole engagement surface.

19. The solenoid actuator of claim 14, wherein:
the actuation rod includes a first end and a second end;
the first end is coupled to the armature; and
the second end is coupled to a component that is to be actuated.

20. The solenoid actuator of claim 14, wherein:
the lower spring guide includes a lower spring guide opening and a lower spring guide land;
the upper spring guide includes an upper spring guide opening and an upper spring guide land;
the actuation rod extends through the lower spring guide opening and the upper spring guide opening; and the spring engages the upper spring guide land and the lower spring guide land.

\* \* \* \* \*